United States Patent [19]

Arbisi et al.

[11] Patent Number: 5,182,675
[45] Date of Patent: Jan. 26, 1993

[54] PIVOT DOWN ARTICULATED MIRROR

[75] Inventors: Thomas E. Arbisi, Holland; Ronald A. Dykstra, Grandville; Gordon J. Stannis, Berkley, all of Mich.

[73] Assignee: Prince Corporation, Holland, Mich.

[21] Appl. No.: 806,615

[22] Filed: Dec. 12, 1991

[51] Int. Cl.⁵ .................................................. G02B 7/18
[52] U.S. Cl. .................................. 359/841; 359/844; 359/881; 248/473; 248/480
[58] Field of Search ............... 359/841, 844, 871, 875, 359/881, 882; 248/472, 473, 476, 479, 480

[56] References Cited

U.S. PATENT DOCUMENTS

| | | |
|---|---|---|
| 1,819,516 | 8/1931 | Kelley . |
| 2,012,593 | 8/1935 | Strong . |
| 2,060,062 | 11/1936 | Fischer . |
| 2,149,598 | 3/1939 | Girl et al. . |
| 2,319,745 | 5/1943 | Napoli . |
| 3,834,782 | 9/1974 | Pampinella . |
| 4,614,412 | 9/1986 | Cohen . |
| 4,624,499 | 11/1986 | Flowerday ................ 359/841 |
| 4,824,159 | 4/1989 | Fluharty et al. . |
| 4,911,545 | 3/1990 | Miller ........................ 359/841 |
| 4,916,595 | 4/1990 | Naruke et al. . |
| 4,939,802 | 6/1990 | Fluharty et al. . |
| 4,941,638 | 7/1990 | DiSalvatore . |

Primary Examiner—Bruce Y. Arnold
Assistant Examiner—J. P. Ryan
Attorney, Agent, or Firm—Price, Heneveld, Cooper, DeWitt & Litton

[57] ABSTRACT

A mirror is mounted to the roof of a vehicle by a pivot arm assembly for pivotally coupling the mirror to a vehicle for movement from side to side and for movement between a raised stored position and a lowered use position. In a preferred embodiment, the pivot arm has one end pivotally mounted to a housing for storably receiving the mirror and an opposite end coupled to the mirror using both a hinge and a ball joint to allow compact storage of the mirror in the housing and full adjustability for use.

20 Claims, 2 Drawing Sheets

PIVOT DOWN ARTICULATED MIRROR

BACKGROUND OF THE INVENTION

The present invention pertains to a vanity mirror for use in a vehicle and particularly one which can be used conveniently by persons in different seating areas.

Vanity mirrors have received widespread use and acceptance in vehicles to allow for last minute personal grooming while en route to a destination. Many vehicles include as standard equipment, an illuminated vanity mirror visor such as disclosed in U.S. Pat. No. 4,227,241. Also, specialized vanity mirror systems have been developed such as set forth in U.S. Pat. No. 4,824,159 in which an illuminated vanity mirror can be pivoted down from the roof of a vehicle and pivoted from side to side. As vehicles become more compact and as the windshield angle becomes more severe, headliner space is at a premium. This places severe design constraints on the automotive designer in terms of adding accessories such as vanity mirrors to the roof area of a vehicle.

In order to provide a useful vanity mirror, it must be positioned a reasonable distance such as from about 12-18 inches from the face of the user so that a clear image of sufficient size is provided. With vehicles having a severely raked windshield angle the windshield-to-roof line is moved rearwardly and the placement of a vanity mirror in the front area of the headliner becomes problematical since the available mounting area is too close to the user.

One location which is highly desirable is the location for a rearview mirror which typically is centrally mounted to the windshield of the vehicle at eye level. Unfortunately, rearview mirrors are relatively long and narrow and therefore not particularly suited for use as a vanity mirror. Also the adjustment of such a mirror by a passenger poses a safety hazard since the driver is not provided with rear vision during the period of use by a passenger as a vanity mirror. Further, it requires an annoying re-adjustment of the rearview mirror whenever it is used for a vanity mirror. Also, the rearview mirror is not movable toward and away from either of the occupants since it is anchored at a fixed center point in the windshield area. Thus, although the rearview mirror provides a mirror at eye level and one which is centrally located between the passenger and vehicle operator, it is not suitable for use as a vanity mirror.

Thus, it is desirable to provide a vanity mirror accessory for a vehicle which positions the mirror sufficiently close and not excessively distant from the user so that it provides a functional image for use for personal grooming. At the same time it is desirable to provide a mirror system which allows either the driver or passenger to selectively use such a mirror so that only one mirror is necessary for both locations.

SUMMARY OF THE PRESENT INVENTION

The mirror system of the present invention provides a solution for the newer design vehicles in which a compact interior space is provided with a roof line which projects rearwardly immediately in front of the occupants head. It also provides a vanity mirror system which can be centrally located without interfering with the use of the normal rearview mirror of a vehicle such that it does not disturb the adjustment position of the rearview mirror.

Mirror systems embodying the present invention include a mirror and an elongated pivot arm assembly for pivotally coupling said mirror to a vehicle for movement from side-to-side and between a raised stored position and a lowered use position. The pivot arm assembly also is coupled to the mirror to allow the mirror to be fully adjusted once lowered for use. In a preferred embodiment of the invention, a receiving housing is provided which is preferably mounted within a recess of the vehicle headliner for receiving the mirror in a position flush with the headliner when in a raised stored position. In a preferred embodiment of the invention, at least one arcuate guide track is provided in the receiving housing and the pivot arm is coupled thereto for controlling the pivotal movement of the arm between the opposite ends thereof. In a preferred embodiment of the invention also, the coupling of the end of the pivot arm to the mirror includes a ball joint and a hinge for allowing the mirror to pivot downwardly in a first direction through an arc of up to 180 degrees and rotate and pivot using the ball joint.

Such construction provides compact storage of a relatively large and therefore useful vanity mirror and positions the mirror in an optimal location of the vehicle and provides motion of the mirror for use by either the vehicle operator or passenger without interference with the rearview mirror of the vehicle. These and other features, objects and advantages of the present invention will become apparent to those skilled in the art upon reading the following description thereof in connection with the accompanying drawings in which:

DETAILED DESCRIPTION OF THE PREFERRED EMBODIMENT

Figure 1:
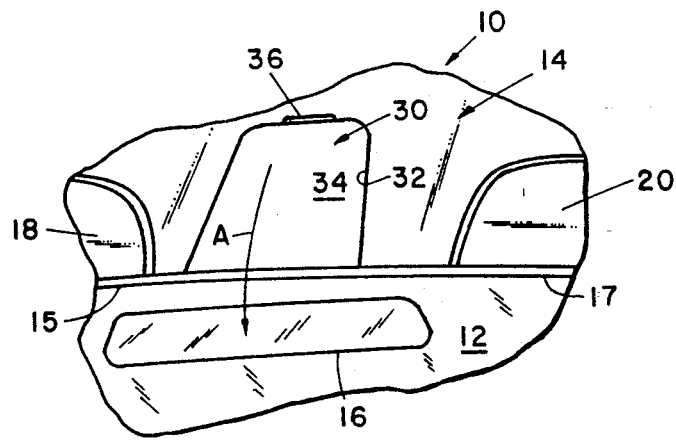
FIG. 1 is a perspective view of a vehicle including a vanity mirror assembly embodying the present invention shown in a first or stored position.

Referring initially to FIG. 1 there is shown a vehicle 10 such as an automobile which includes a front windshield 12 and a roof including a headliner 14 overlying the typical sheet metal and beam structure. A rearview 16 is mounted in the center windshield area near the top edge 17 of windshield 12 between the passenger and driver's side of the vehicle. The vehicle 10 also includes a driver's side sun visor 18 and a passenger side sun visor 20 which span opposite sides of the rearview mirror 16. Trim molding 15 extends between the headliner 14 and windshield 12 in a conventional manner.

Figure 2:
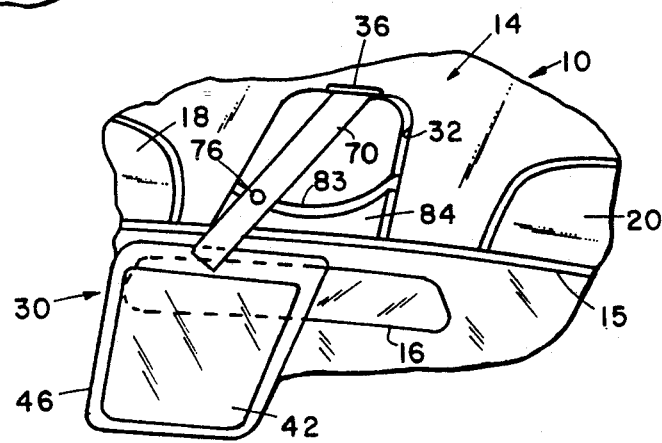
FIG. 2 is a perspective view of the structure shown in FIG. 1 with the vanity mirror assembly in a lowered first use position.
Figure 3:
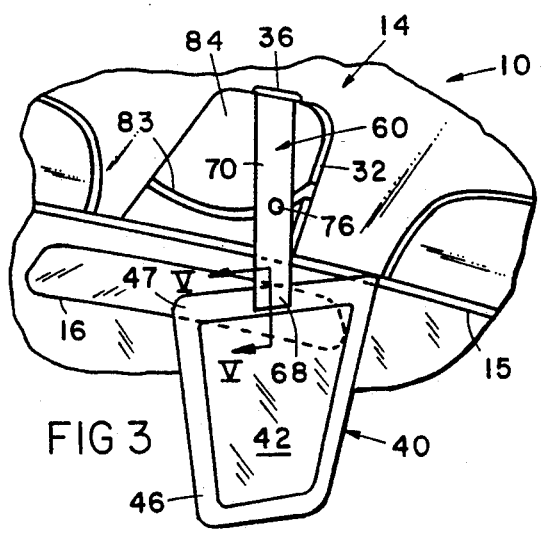
FIG. 3 is a perspective of the structure shown in FIGS. 1 and 2 showing the mirror moved to the passenger side of the vehicle and tilted to a second use position.

Positioned above the trim molding 15 between visors 18 and 20 is a vanity mirror assembly 30 embodying the present invention. In FIG. 1 the vanity mirror assembly is shown in a stored position within a recess 32 formed in the lower edge of headliner 14 for storably receiving the vanity mirror assembly. The vanity mirror assembly includes an outer vanity mirror cover 34 which can be upholstered to match the upholstery material of headliner 14 or a pebble grained plastic material such as polycarbonate colored to match the vehicle interior. Along the rearward facing edge of the headliner recess 32 there is provided a notch 36 allowing access for the operator for grasping the edge of housing 46 for the pivoting of the vanity mirror from a stored position flush with the vehicle roof in headliner 14 as shown in FIG. 1 downwardly as indicated by arrow A to a use position as shown in FIGS. 2 and 3 which is lowered below the molding 15 of the windshield and in front of the rearview mirror 16.

The vanity mirror assembly 30 comprises three subassemblies including a vanity mirror housing 40, an elongated pivot arm assembly 60, and a receiving housing 80 (FIG. 4) to which the vanity mirror assembly is attached and which in turn is secured to the vehicle roof in a conventional manner. As can be seen in FIGS. 2 and 3, the vanity mirror housing 40 includes a vanity mirror 42 which is trapezoidal to generally conform to the height and width ratio of a user's face. The mirror can be moved to the driver's side of the center of the vehicle as illustrated in FIG. 2 for use by the driver or moved to a position to the right as illustrated in FIG. 3 and rotated for use by a passenger on the right side of the vehicle. In the position shown in FIG. 3, the mirror is tilted and rotated illustrating the adjustability of the vanity mirror assembly as provided by the present invention.

Figure 4:
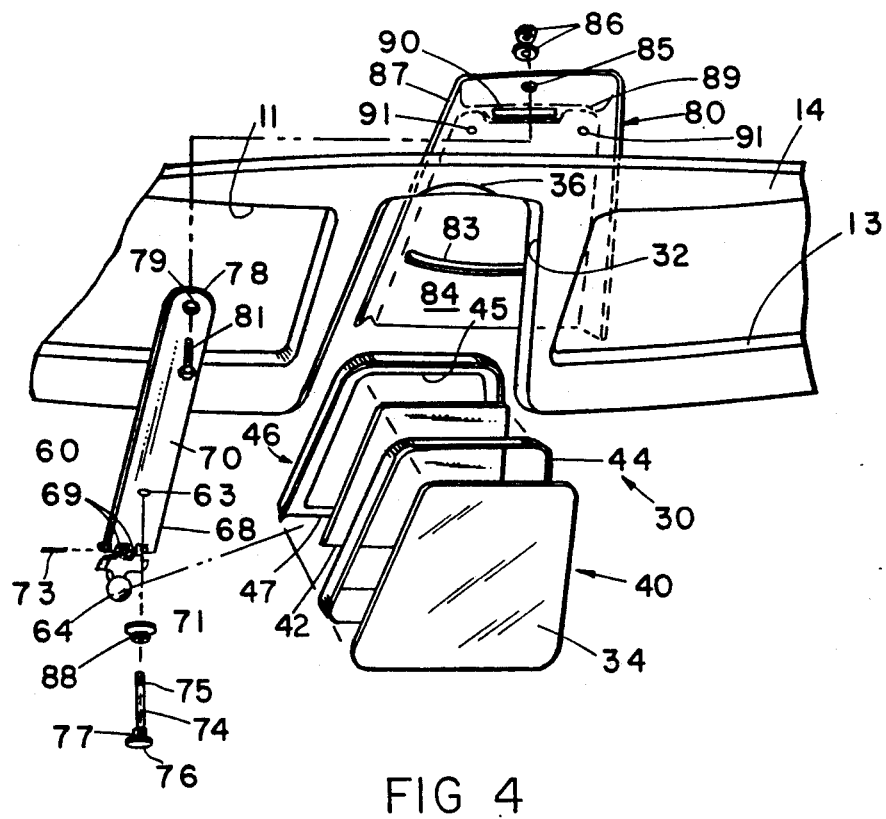
FIG. 4 is an exploded perspective view of the vanity mirror assembly of the present invention.

Turning now to FIG. 4, the construction of the vanity mirror assembly 30 is described in greater detail. In the embodiment shown, the headliner 14 includes recesses 11 and 13 for receiving visors 18 and 20 in compact stored relationship. FIG. 4 does not show the visors for purposes of simplifying the drawings. As can be seen in FIG. 4, the headliner 14 includes a generally rectangular recess 32 for receiving the vanity mirror housing 40 which includes the outer decorative cover plate 34, a generally trapezoidal shaped rim 44 to which cover plate 34 is attached by suitable means such as by ultrasonic welding. The vanity mirror frame 46 has a top edge 47 or lip to which the pivot arm assembly is attached. Frame 46 includes a generally trapezoidal opening 45 to expose the trapezoidal reflective mirror 42. Attached to the top 47 of frame 46 is the pivot arm assembly 60 which includes a socket member 62 (FIG. 5) including a generally spherical socket 61 for receiving a pivot ball 64 which is hingedly mounted by means of plate 66 and hinge 67 to one end 68 of pivot arm 70. Hinge 67 is conventionally formed with interleaved legs 69 having axial apertures 71 formed therein for receiving a hinge pin 73 to allow pivot arm 70 to pivot with respect to frame 47 through members 62 and 66. This allows housing 47 and mirror 42 therein to pivot through an arc of up to approximately 180 degrees. The pin 73 is sufficiently tight with respect to legs 69 such that the mirror housing will stay at any desired lowered adjusted position.

Figure 5:
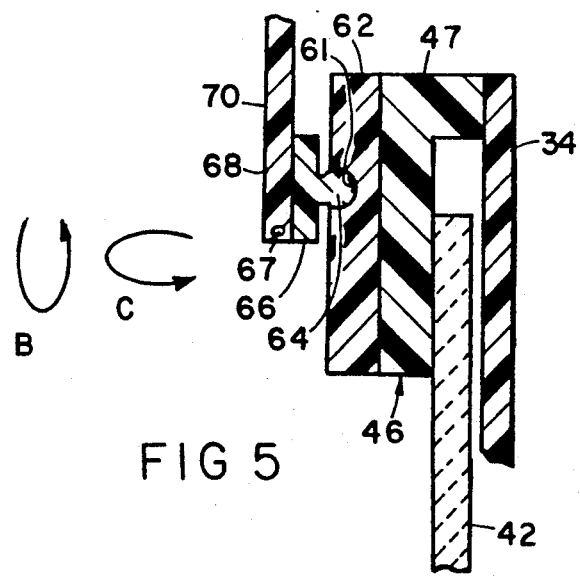
FIG. 5 is an enlarged cross-sectional view taken along section line V—V of FIG. 3 showing the coupling of the vanity mirror housing to the pivot arm.

As seen in FIG. 5, the mounting plate 66 and pivot arm 70 are substantially flush and adjacent one another with the ball 64 extending forwardly in the vehicle for exposing the mirror in a rearward direction facing the user of the vanity mirror (to the left in FIG. 5). Once in this position, the socket plate 62 in connection with the spherical socket 61 and ball 64, permit the mirror to be tilted in a direction indicated by arrow B in FIG. 5 or rotated along an axis orthogonal to the tilt axis shown by arrow C in FIG. 5 or any degree of freedom between these two orthogonal axis as is permitted by the ball joint mounting arrangement between the mirror housing 47 and pivot arm 70.

Pivot arm assembly 60 further includes a guide pin 74 with an enlarged head 76 and collar 77 which extends through an aperture 63 in the generally elongated rectangular pivot arm 70. Thus, collar 77 extends through aperture 63 and is sufficiently long to extend through an arcuate slot 83 in the retainer housing 80 behind which a retainer nut 88 is mounted to a threaded end 75 of pin 74 for retaining the pivot arm 70 in guided relationship with respect to arcuate slot 83 and to hold the pivot arm 70 substantially adjacent the floor 84 of the concave housing 80. Aperture 63 is proximate the lower end 68 of pivot arm 70 which has an opposite end 78 having an aperture 79 formed therethrough for receiving pivot pin and bolt 81 which extends through an aperture 85 in receiving housing 80 and is secured thereto by a nut and lookwasher combination 86.

Housing 80 is a generally rectangular U-shaped open member having a floor 84 and an upstanding peripheral rim 87 extending along three edges of the trapezoidal shaped floor 84. An intermediate wall 89 is spaced from the end of rim 87 and includes a slot 90 formed therein through which the pivot arm 70 also extends for supporting the pivot arm in an area adjacent to the pivot connection provided by pin 81 to housing 80. Thus, the pivot arm 70 can be a relatively thin, flat material which is supported by guide and support pin 74 through slot 83, by an elongated rectangular slot 90 in wall 89, and by pivot pin 81 thereby supporting the pivot rod 70 for pivotal movement in an arc of approximately 45 degrees for the movement of the mirror housing 40 between the positions shown in FIGS. 2 and 3. The pivot arm 70 has a length which is substantially the same or slightly longer than the elongated axis of the mirror 42 such that the top edge 47 of housing 40 will clear the forward edge of recess 32 in headliner 14 as seen in FIGS. 2 and 3 when the mirror is lowered for use. By permitting the use of a relatively thin pivot arm using this mounting structure, the mirror assembly can be fitted in a generally compact space. Housing 80 includes aperture means 91 at suitable spaced locations therein for securing the receiving housing 80 to the sheet metal structure of the vehicle roof.

The vanity mirror assembly elements 44 and 45 can, like panel 34, be molded of a polymeric material such as polycarbonate as can be the relatively thin, elongated pivot arm 70 and housing 80. The ball receiving socket member 62 may be split for receiving ball 64 within the spherical socket 61 and subsequently joined and bonded to end 47 of frame 46 in a conventional manner such as by ultrasonic welding or by a suitable bonding adhesive or solvent. Typically, assembly 30 is pre-assembled by first assembling the pivot arm assembly 60 including the pivot and ball joint assembly including ball 64 and plate 66 utilizing hinge pin 73 to join member 66 to pivot arm 70. The pivot arm 70 then is mounted within receiving housing 80 by sliding the pivot arm 70 through slot 90 and extending pin 74 through aperture 63 and slot 83 and securing backing nut 88 to pin 74. Next, the pivot pin 81 is extended through aperture 79 through aperture 85 and secured to housing 80 by backing nut and washer 86. Finally, the mirror housing 40 is assembled with mirror 42 in place and ball 64 secured within socket 6 which then is secured to member 46 by a suitable fastening means discussed above. The housing 80 can then be mounted within the recess 32 of the vehicle by fastening screws extending through apertures 91. If desired, assembly 30 can be attached to the headliner 14 if the headliner includes a suitable mounting structure which can be secured to the peripheral wall 87 by suitable fastening means such as elbow mounting brackets or the like.

In some embodiments of the invention, the headliner need not be recessed and the housing assembly 80 and interconnecting pivot arm assembly 60 can be mounted to the outer surface of the headliner. In such case, the outer surface of the peripheral wall 87 of housing 80 could be decorative to provide a neat trim appearance to the system when in a stored position. In some embodiments, it may be desirable to include illumination means such as taught by U.S. Pat. No. 4,824,159 issued on Apr. 25, 1989, the disclosure of which is incorporated herein by reference. These and other modifications to the preferred embodiment as described herein can be made by those skilled in the art without departing from the spirit or scope thereof as defined by the appended claims.

The embodiments of the invention in which an exclusive property or privilege is claimed are defined as follows:

1. An adjustable mirror assembly for a vehicle comprising:
   a mirror housing having a mirror mounted therein;
   a pivot arm assembly including a pivot arm having a length substantially as long as said mirror; and
   mounting means including a housing, said mounting means pivotally mounting one end of said pivot arm to a vehicle support member and an opposite end to said mirror housing for adjustable movement of said mirror form a stored position to a use position, and guide means coupling said pivot arm to said housing such that said mirror can be translated form side-to-side once lowered to a use position, and adjustably rotated.

2. The assembly as defined in claim 1 wherein said mounting means includes a pivot pin at said one end and hinge means at said opposite end.

3. The assembly as defined in claim 2 wherein said mounting means further includes a ball joint extending between said housing and said opposite end of said pivot arm.

4. The assembly as defined in claim 3 wherein said ball joint is positioned between said housing and said hinge means.

5. An adjsutable mirror assembly for a vehicle comprising:
   a mirror housing having a mirror mounted therein;
   a pivot arm assembly including a pivot arm having a length substantially as long as said mirror; and
   mounting means for pivotally mounting one ned of said pivot arm to a vehicle support member and an opposite end to said mirror housing for adjustable movement of said mirror form a stored position to a use position in which said mirror can be moved from side-to-side and adjustably rotated wherein said mounting means includes a pivot pin at said one end and hinge means at said opposite end, wherein said mounting means further includes a ball joint extending between said mirror housing and said hinge means, and wherein said mounting means further includes a housing for receiving said mirror housing, said housing including guide means for said pivot arm.

6. The assembly as defined in claim 5 wherein said guide means includes a pair of spaced guide slots.

7. The assembly as defined in claim 6 wherein said housing includes means at one end for receiving said pivot pin.

8. The assembly as defined in claim 7 wherein said housing includes a wall spaced from one end, said wall including one of said guide slots formed therein for receiving said pivot arm.

9. The assembly as defined in claim 8 wherein the other of said guide slots comprises an arcuate slot formed in a floor of said housing in spaced relationship to said one end.

10. The assembly as defined in claim 9 wherein said pivot arm includes a guide pin coupling said pivot arm to said arcuate slot of said housing.

11. The assembly as defined in claim 9 wherein said pivot arm includes a guide pin coupling said pivot arm to said arcuate slot of said receiving housing.

12. An adjustable mirror assembly for mounting within a recess formed in the headliner of a vehicle comprising:
   a mirror housing having a mirror mounted therein;
   a receiving housing including means for mounting said receiving housing to the roof of a vehicle;
   a pivot arm assembly including a pivot arm having one end pivotally mounted to said receiving housing; and
   mounting means for pivotally mounting an opposite end of said pivot arm to said mirror housing for adjustable movement of said mirror from a stored position within said receiving housing to a use position said mounting means including guide means extending between said pivot arm and said housing such that said mirror can be translated from side-to-side once lowered to a use position, and adjustably rotated.

13. The assembly as defined in claim 12 wherein said mounting means includes hinge means.

14. The assembly as defined in claim 13 wherein said mounting means further includes a ball joint extending between said housing and said opposite end of said pivot arm.

15. The assembly as defined in claim 14 wherein said ball joint is positioned between said housing and said hinge means.

16. An adjustable mirror assembly for mounting within a recess formed in the headliner of a vehicle comprising:
   a mirror housing having a mirror mounted therein;
   a receiving housing including means for mounting said receiving housing to the roof of a vehicle;
   a pivot arm assembly including a pivot arm having one end pivotally mounted to said receiving housing; and
   mounting means including hinge means for pivotally mounting an opposite end of said pivot arm to said mirror housing for adjustable movement of said mirror from a stored position within said receiving housing to a use position in which said mirror can be moved from side-to-side and adjsutably rotated, wherein said mounting means includes a ball joint extending between said mirror housing and said hinge means, and wherein said receiving housing includes guide means for said pivot arm.

17. The assembly as defined in claim 15 wherein said guide means includes a pair of spaced guide slots.

18. The assembly as defined in claim 17 wherein said receiving housing includes a wall spaced from one end, said wall including one of said guide slots formed therein for receiving said pivot arm.

19. The assembly as defined in claim 18 wherein said receiving housing includes a floor and wherein the other of said guide slots comprises an arcuate slot formed in said floor of said housing in spaced relationship to said one end.

20. A pivot-down articulated mirror assembly for use by occupants on either side of a vehicle seat comprising:
  a mirror;
  a housing including means for mounting said housing centrally to the roof of a vehicle;
  a pivot arm having one end pivotally mounted with respect to said housing and means for coupling an opposite end to said mirror for adjustable movement of said mirror from a stored position within said housing to a lowered use position, wherein said pivot arm is sufficiently long such that said mirror can be translated from side-to-side and adjustably rotated for use by occupants of seats on either side of the vehicle; and
  guide means extending between said pivot arm and said housing at a location between said mirror and said coupling means to guide and support said pivot arm as it is translated once said mirror is lowered to a use position.

* * * * *

UNITED STATES PATENT AND TRADEMARK OFFICE
CERTIFICATE OF CORRECTION

PATENT NO. : 5,182,675

DATED : January 26, 1993

INVENTOR(S) : Arbisi et al

It is certified that error appears in the above-indentified patent and that said Letters Patent is hereby corrected as shown below:

Column 2, line 55, After "rearview" insert --mirror--.

Column 5, lines 35,38, claim 1, "form" should be --from--.

Column 5, line 1, claim 5, "adjsutable" should be --adjustable--.

UNITED STATES PATENT AND TRADEMARK OFFICE
CERTIFICATE OF CORRECTION

PATENT NO. : 5,182,675

DATED : January 26, 1993

INVENTOR(S) : Arbisi et al

It is certified that error appears in the above-indentified patent and that said Letters Patent is hereby corrected as shown below:

Column 5, claim 5, line 55:

"ned" should be --end--.

Column 6, claim 16, line 62:

"adjsutably" should be --adjustably--.

Column 6, claim 17, line 67:

"claim 15" should be --claim 16--.

Signed and Sealed this

Twelfth Day of April, 1994

Attest:

BRUCE LEHMAN

*Commissioner of Patents and Trademarks*

*Attesting Officer*